United States Patent [19]
Righettini et al.

[11] Patent Number: 5,859,160
[45] Date of Patent: Jan. 12, 1999

[54] ADDITIVES FOR CONTROLLING CURE RATE OF POLYMERIZABLE COMPOSITION

[75] Inventors: Robin F. Righettini, Apex; Kirk J. Abbey, Raleigh, both of N.C.

[73] Assignee: Lord Corporation, Cary, N.C.

[21] Appl. No.: 781,555

[22] Filed: Jan. 9, 1997

[51] Int. Cl.⁶ .................................. C08F 12/06; C09J 4/02
[52] U.S. Cl. ..................... 526/347.1; 526/284; 526/293; 526/303.1; 526/307.5; 526/307.8; 526/318.2; 526/318; 526/318.4; 526/318.5; 526/318.6; 526/320; 526/321; 526/323.2; 526/329.1; 526/329.2; 526/330; 526/331; 526/336; 526/340; 526/342; 526/346; 525/126; 525/127; 525/130; 525/193; 525/279; 525/287; 525/288; 525/289; 525/292; 525/301; 525/303; 525/305; 525/310; 525/312; 525/316; 525/939; 156/330; 156/331.7; 156/333; 156/334
[58] Field of Search ................................. 526/284, 318.6, 526/347.1, 307.5, 307.8, 318.2, 318.5, 293, 307.1, 318.4, 321, 329.1, 329.2, 330, 331, 336, 340; 156/330, 333, 334, 331.7; 525/193, 255, 310, 939, 126, 127, 130, 287, 288, 289, 279, 292, 301, 303, 305, 312, 316

[56] References Cited

U.S. PATENT DOCUMENTS

| 3,050,505 | 8/1962 | Litterio | 526/318.5 X |
| 3,725,504 | 4/1973 | Owston | 260/876 |
| 3,832,274 | 8/1974 | Owston | 161/183 |
| 3,873,640 | 3/1975 | Owston et al. | 260/859 |
| 3,959,568 | 5/1976 | Hill et al. | 428/462 |

FOREIGN PATENT DOCUMENTS

| 0 040 079 A1 | 11/1981 | European Pat. Off. . |
| 0 268 985 A2 | 6/1988 | European Pat. Off. . |
| 0 435 173 A2 | 7/1991 | European Pat. Off. . |

*Primary Examiner*—Fred Teskin
*Attorney, Agent, or Firm*—Wayne W. Rupert

[57] ABSTRACT

A free radical curable composition that includes a free radical curable and a vinyl aromatic compound that is chemically different than the free radical curable component, wherein the vinyl aromatic compound is present in an amount sufficient to decelerate the cure rate of the free radical composition without adversely effecting completion of cure and the properties of the curable composition after it has cured. The composition is particularly useful as a two part adhesive that includes a free radical catalyst system and a diene elastomer.

28 Claims, No Drawings

ADDITIVES FOR CONTROLLING CURE RATE OF POLYMERIZABLE COMPOSITION

BACKGROUND OF THE INVENTION

The present invention relates to controlling the cure rate of polymerizable or curable compositions that include a polymerizable component such as an ethylenically unsaturated compound. The invention is particularly useful for formulating adhesive compositions.

Curing is accomplished by activating a polymerization catalyst in the presence of a reactive component. Well known polymerization catalyst systems include aldehyde-amine condensation product systems and redox catalyst systems. A combination of these systems often is used to achieve cure. The present invention is especially useful for systems that at least include a free radical initiator or generator.

Most research efforts concerning such polymerization catalyst systems have been directed to accelerating rather than decelerating the rate of cure. However, end users of curable compositions such as adhesives have a need for slower curing products. If cure can be decelerated, this allows for a longer period of time for application and use of the curable composition after the polymerization catalyst has been activated, but before final cure has been achieved. In addition, it would be very useful to have a system in which the cure rate of a particular adhesive formulation could be adjusted easily during or after production.

A few approaches for slowing cure rate have been tried. For example, aldehyde-amine condensation products mentioned above and tertiary amines can be used as cure rate accelerators. One method for slowing the cure rate is to simply add a smaller amount of such accelerators. The problem with this approach is that the tendency of atmospheric oxygen to inhibit complete cure increases and the rate of cure of samples from the same batch or composition becomes erratic. A strong acid such as the reaction product of phosphorus pentoxide and 2-hydroxyethyl methacylate also can retard cure, but such material is expensive and the effect on cure rate is relatively small based on the amount of material added.

U.S. Pat. No. 3,725,504 relates to a 3 component adhesive that includes component A that is derived by partially polymerizing a mixture of polychloroprene, methylmethacrylate and styrene. Component A is then mixed with two other components to achieve the end product adhesive composition.

U.S. Pat. No. 3,832,274 relates to an adhesive that includes (A) 1–30 wt % of an elastomeric polymer, (B) 25–85 wt % of a polymerizable acrylic monomer, (C) 0–50 wt % of at least one ethylenically unsaturated non-acrylic monomer, (D) 0–60 wt % of a polymer derived from monomer (B) and/or (C), (E) 5–20 wt % of methacrylic acid and (F) 0.04–4 wt % of a reducing component of redox system. Styrene, chlorostyrene, vinyl toluene and vinyl acetate are listed in the specification as possible (C) monomers. Adhesive IVB described in Table XIII includes 5 pbw styrene and 15 pbw chlorostyrene.

U.S. Pat. No. 4,223,115 relates to a structural adhesive that can include the following possible free radical polymerizable components:

(1) a polymer-in-monomer syrup wherein the monomer can be a mixture of methyl methacrylate and styrene (see U.S. Pat. No. 3,725,504 above);
(2) 10–90 wt % of at least one polymerizable material selected from a list wherein styrene and methyl methacrylate are included in the list, 10–90 wt % of at least one reaction product of isocyanate-functional prepolymer and hydroxy-functional monomer, 0.5–30 wt % (meth)acrylic acid, and 0–20 wt % of at least one polymerizable ethylenically unsaturated monomer;
(3) the adhesive mixture disclosed in U.S. Pat. No. 3,832,274 above;
(4) chlorosulfonated polyethylene and at least one polymerizable olefinically unsaturated monomer; or
(5) 25–95 wt % of at least one alkyl ester or hydroxy alkyl ester of (meth)acrylic acid, and 5–75 wt % of polyvinyl alkyl ether, styrene-acrylonitrile resin or unsaturated polyester resin.

Styrene, vinyl styrene and methylstyrene are included in the list of possible olefinically unsaturated compounds for classes (1), (2), (3) and (4), but there does not appear to be any example in the patent wherein any of these compounds are present as a distinct or separate component of the end product adhesive formulation.

SUMMARY OF THE INVENTION

According to this invention there is provided a curable composition wherein the cure rate can be decelerated by adding a vinyl aromatic compound. The cure rate can easily be adjusted by varying the amount of added vinyl aromatic compound. The addition of the vinyl aromatic compound, and consequently the cure rate adjustment, can be accomplished either during manufacturing of the curable composition or after the curable composition has been made. In particular, the curable composition includes a curable component and a vinyl aromatic compound present in an amount sufficient to decelerate the cure rate of the curable composition without adversely effecting completion of cure and the properties of the curable composition after it has cured. The curable component is chemically different than the vinyl aromatic compound and, preferably, is not itself a vinyl aromatic compound.

The invention is especially useful for two-part, free radical curable adhesive compositions wherein one part includes a free radical curable component and the other part includes at least one component (for example, an oxidizing agent or a reducing agent) of a free radical curing system. The free radical curable component preferably includes a (meth)acrylate-based monomer.

DETAILED DESCRIPTION OF THE PREFERRED EMBODIMENTS

As used herein, "vinyl aromatic compound" means a compound (excluding a polymer or an oligomer) that includes a vinyl functional group bonded to at least one aryl ring. The vinyl aromatic compound can be substituted in the sense that another functional group can be bonded to the vinyl-functional group or the aryl ring. Preferably, the vinyl aromatic compound has a structure represented by the following formula A:

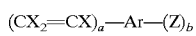

wherein each X is the same or different and is hydrogen, alkyl, aryl or halogen; Ar is at least one aryl ring; and Z is a substituent on any position of the aryl ring(s) and is alkyl, alkoxy, aryl, aryloxy, halogen, haloalkyl, haloaryl, alkylaryl, arylalkyl, alkanoyl, and oxyalkanoyl; a is 1 or 2; and b is 0 to 9, preferably 1 to 9. X preferably is hydrogen or methyl. Ar preferably is only one aryl ring, but may be up to three rings. Ar also can be an aryl ring that include a heteroatom such as nitrogen, oxygen or sulfur. Z preferably is an alkyl group such as methyl, ethyl or tert-butyl, a halogen such as chlorine or bromine, a haloalkyl such as chloromethyl, or an oxyalkanoyl such as acetoxy. A substituted vinyl aromatic compound (i.e., X is a group other than hydrogen and/or b is at least 1) is preferred. If the substituent groups X or Z contain carbon, the number of carbon atoms can be limited to a reasonable amount (such as 10) to prevent steric hindrance, reactivity or synthesis problems.

Illustrative vinyl aromatic compounds include α-methylstyrene, 3-methylstyrene, 4-methylstyrene (i.e., vinyl toluene), 4-tert-butylstyrene, 4-methoxystyrene, 9-vinylanthracene, 2-bromostyrene, 3-bromostyrene, 4-bromostyrene, 4-acetoxystyrene, 4-benzyloxy-3-methoxystyrene, 4-chloromethylstyrene, 4-vinylpyridine, 1,1-diphenylethylene, styrene, α-methyl-p-methyl styrene, 2-vinyl pyridine and divinyl benzene. Especially preferred are α-methylstyrene and 4-methylstyrene.

As mentioned above, addition of the vinyl aromatic compound to a curable composition decelerates the cure rate. It should be recognized that the curable composition includes a polymerization catalyst or curing system. Thus, the curable composition without the vinyl aromatic compound has a given or predetermined cure rate depending on the particular curable component, cure conditions and curing system. According to the present invention, addition of the vinyl aromatic compound decelerates this predetermined cure rate.

The vinyl aromatic compound is added in a sufficiently small amount so that the completion of cure is not adversely effected. In other words, if too much of the vinyl aromatic compound is added the system fails to even initiate cure, much less cure to completion, typically resulting in the formation of a gel-like composition rather than a hardened composition. In addition, if too much vinyl aromatic compound is added the properties of the cured composition may be adversely effected. For example, if the composition is to be used as an adhesive, the adhesive properties of the composition may decrease. The maximum amount varies depending upon the specific vinyl aromatic compound and the other components of the composition. As is shown in the Examples below, certain vinyl aromatic compounds such as α-methylstyrene have a greater impact on cure rate deceleration. Such vinyl aromatics can be added in smaller amounts such as less than 2 weight percent based on the total weight of the part of the composition that includes the free radical curable component. Other vinyl aromatic compounds such as 4-methylstyrene have a smaller impact on cure rate deceleration and, thus, can be added in larger amounts such as up to 5 weight percent based on the total weight of the part of the composition that includes the free radical curable component. In general, the amount of vinyl aromatic compound can be less than 5 weight percent, preferably less than 2 weight percent, based on the total weight of the part of the composition that includes the free radical curable component.

The vinyl aromatic compound should be present in a minimum amount sufficient to decelerate cure of the curable composition. The specific minimum amount will vary depending upon a number of factors including the specific vinyl aromatic compound, the specific curable composition and curing system, and the desired degree of cure deceleration. In general, the system can include at least 0.1, preferably 0.5, weight % of the vinyl aromatic compound based on the total weight of the part of the composition that includes the free radical curable component.

The composition and method of the invention is especially useful in the formulation of an adhesive, particularly a structural adhesive used in the bonding of lightweight metal and plastic materials in the fabrication, repair and reconstruction of transportation vehicle bodies and component parts. In the case of an adhesive application for the bonding of large structural assemblies such as automobile panels, an open time of up to 60 minutes is desirable. "Open time" as used herein means the amount of time after the polymerization catalyst has been activated in the presence of the curable component (e.g., parts A and B of a two-part adhesive are mixed together) and before the composition reaches a cure stage beyond which the composition is unworkable. In general, the minimum amount of vinyl aromatic compound should be sufficient to decelerate the cure rate at room temperature by at least 2, preferably 5 or more, minutes.

The vinyl aromatic compound can be used in any curable composition that also includes a polymerizable component such as an ethylenically unsaturated compound. It is particularly useful in free radical polymerizable or curable compositions, such as described in U.S. Pat. Nos. 2,981,650; 3,321,351; 3,890,407; 4,223,115; 4,293,665; 4,467,071; 4,452,944; 4,536,546; 5,206,288 and 4,769,419, all incorporated herein by reference. Such free radical polymerizable compositions include a polymerizable component that includes at least one free radical polymerizable ethylenically unsaturated monomer characterized by the presence of a —C=C— group, polymer derived from such monomer or mixtures of monomer and polymer. It should be recognized that the ethylenically unsaturated compound of the polymerizable component is chemically different than the vinyl aromatic compound cure rate-decelerator of the invention.

(Meth)acrylic-based monomers and/or polymers derived from (meth)acrylic-based monomers are particularly useful as at least part of the polymerizable component. As used herein, (meth)acrylic-based monomer means acrylic acid, methacrylic acid or an amide, ester, salt or nitrile thereof. Representative (meth)acrylic-based monomers include, but are not limited to, methyl methacrylate, ethyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, 2-ethylhexyl methacrylate, hexyl methacrylate, cyclohexyl methacrylate, lauryl methacrylate, tetrahydrofuryl methacrylate, methacrylic acid, acrylic acid, acrylonitrile, methacrylonitrile, glycidyl methacrylate, cyanoacrylate, acrylamide and methacrylamide.

Other ethylenically unsaturated monomer classes include maleate esters; fumerate esters; vinyl esters such as vinyl acetate; conjugated dienes such as 2,3-dichloro-1,3-butadiene and 2-chloro-1,3-butadiene; itaconic acid and esters thereof; and vinylidene halides.

Preferred free radical polymerizable monomers are methyl methacrylate and tetrahydrofuryl methacrylate.

The polymerizable component typically is present in the composition in an amount from 10 to 90, preferably 20 to 70, weight percent based on the total weight of the part of the composition that includes the curable component.

Particularly in the instance of an adhesive composition, the polymerizable composition of the invention can also include at least one polymeric material, preferably an elastomer, which can act as a toughening agent to provide improved impact and shatter resistance to the cured adhesive and to decrease the brittleness of the cured adhesive. The polymeric material may or may not include an ethylenically unsaturated structure that is capable of being polymerized per se or copolymerized with at least one of the ethylenically unsaturated monomers described above. The polymeric material can be, for example, polychloroprene as described in U.S. Pat. No. 2,981,650; a polymer-in-monomer syrup as described in U.S. Pat. Nos. 3,725,504 and 4,223,115; various solid and liquid elastomeric polymeric materials (e.g., butadiene-based elastomers and urethane-modified butadiene-based elastomers as described in U.S. Pat. Nos. 4,223,115; 4,452,944 and 4,769,419); chlorosulfonated polyethylene rubbers and/or a mixture of sulfonyl chloride with chlorinated polyethylene as described in U.S. Pat. Nos. 3,890,407, 5,206,288 and 4,536,546; and olefinic urethane reaction products of an isocyanate-functional prepolymer and a hydroxy-functional monomer, as described in U.S. Pat. Nos. 4,223,115; 4,452,944; 4,467,071; and 4,769,419. Such elastomers can be present in the compositions of the invention in amounts from 10 to 80, preferably 20 to 50, weight percent based on the total weight of the part of the composition that includes the curable component.

Polymer-in-monomer syrups are well known in the art. The monomer can be any of the ethylenically unsaturated monomers described above. The monomer of the polymer-in-monomer syrup can itself serve as the polymerizable component of the composition or a pre-formed polymer-in-monomer syrup can be mixed with an ethylenically unsaturated monomer. Exemplary polymer-in-monomer syrups are described in U.S. Pat. Nos. 3,725,504 and 4,223,115.

Representative liquid olefinic-terminated elastomers include homopolymers of butadiene; copolymers of butadiene and at least one monomer copolymerizable therewith, for example, styrene, acrylonitrile, methacrylonitrile; as well as modified elastomeric polymeric materials, such as butadiene homopolymers and copolymers as noted above modified by copolymerization therewith of trace amounts or up to about 5 percent by weight of the elastomeric material of at least one functional monomer (such as acrylic acid, methacrylic acid, maleic anhydride, fumaric acid, styrene and methyl methacrylate). The secondary hydroxyl group of liquid butadiene-based elastomers can be reacted with an isocyanate to form a liquid urethane-modified butadiene elastomer as described in U.S. Pat. No. 4,769,419.

Other useful elastomers include a homopolymer or copolymer of epichlorohydrin and ethylene oxide and copolymers of ethylene and acrylate esters, such as methyl acrylate and ethyl acrylate, wherein the copolymer contains at least 30 weight percent acrylate ester that are available from E.I. duPont under the tradename VAMAC.

The chlorosulfonated polyethylene and sulfonyl chloride/chlorinated polyethylene mixture embodiments can have a chlorine content of 25 to 67 weight percent and 3 to 160 mmols sulfonyl chloride moiety per 100 grams of polymer. Further, the polyethylene from which the chlorosulfonated polyethylene is made preferably has a melt index of 4 to 500.

A particularly preferred adhesive composition is an ambient temperature-curable structural adhesive composition that includes
(a) 10–90, preferably 20–70, weight percent of an ethylenically unsaturated monomer selected from the group consisting of (meth)acrylic acid; esters, amides or nitrites of meth)acrylic acid; maleate esters; fumarate esters; vinyl esters; conjugated dienes; itaconic acid and esters thereof; and vinylidene halides;
(b) 10–80, preferably 20–50, weight percent of a diene-based elastomer;
(c) 0–40, preferably 1–25, weight percent of an olefinic urethane reaction product of an isocyanate-functional prepolymer and a hydroxy-functional monomer having at least one unit of polymerizable unsaturation, such reaction product being characterized by the presence of at least two units of unsaturation and the substantial absence of free isocyanate products;
(d) 0–20, preferably 2–10, weight percent of a phosphorus-containing compound having one or more olefinic groups and no less than one P—OH group;
(e) an ambient temperature-active catalyst system that includes at least one reducing agent and at least one oxidizing agent that are co-reactive at ambient temperature to generate free radicals that are capable of initiating and propagating the cure of said adhesive composition; and
(f) less than 5 weight percent of the vinyl aromatic compound, wherein the weight percents are based on the total weight of components (a)–(f).

The free radical-polymerizable adhesive compositions of the invention are normally provided as two package systems, with the packages being mixed or contacted at the time of use to provide a free radical curable adhesive. These two package systems include
(I) a first package comprising
(a) 10–90, preferably 20–70, weight percent of an ethylenically unsaturated monomer selected from the group consisting of (meth)acrylic acid; esters, amides or nitrites of (meth)acrylic acid; maleate esters; fumarate esters; vinyl esters; conjugated dienes; itaconic acid and esters thereof; and vinylidene halides;
(b) 10–80, preferably 20–50, weight percent of a diene-based elastomer;
(c) 0–40, preferably 1–25, weight percent of an olefinic urethane reaction product of an isocyanate-functional prepolymer and a hydroxy-functional monomer having at least one unit of polymerizable unsaturation, such reaction product being characterized by the presence of at least two units of unsaturation and the substantial absence of free isocyanate products;
(d) 0–20, preferably 2–10, weight percent of a phosphorus-containing compound having one or more olefinic groups and no less than one P—OH group
(e) 0.05–10, preferably 0.1–6, weight percent of at least one reducing agent which is interactive with an oxidizing agent to produce free radicals which are capable of initiating and propagating free radical polymerization reactions;
(f) less than 5, preferably less than 2, weight percent of the vinyl aromatic compound; and
(II) a second package comprising
a bonding activator containing an oxidizing agent of a room temperature-active redox couple catalyst system, the oxidizing agent being reactive at room temperature with agent (e) when the first and second packages are mixed to produce free radicals which are capable of initiating and propagating free radical polymerization, the amount of the oxidizing agent being sufficient to interact with agent (e),
wherein the weight percents are based on the total amount of the first package.

The isocyanate-functional prepolymers which are suitable for producing the olefinic urethane reaction product are well-known. Typically, such prepolymers are adducts or condensation products of polyisocyanate compounds having at least two free isocyanate groups and monomeric or polymeric polyols having at least two hydroxy groups, including mixtures of such polyols. The reaction between the polyisocyanate and the polyols is effected employing an excess amount of polyisocyanate to ensure that the isocyanate-functional prepolymer will contain at least two free, unreacted isocyanate groups.

Polyols useful in preparing the isocyanate-functional prepolymer preferably have an number average molecular weight of from about 50 to about 3,000. Suitable polyols include polyalkylene glycols such as polyethylene glycols; polyetherpolyols such as those prepared by additional polymerization of ethylene oxide and a polyol such as trimethylol propane; organic hydroxylated elastomers exhibiting glass transition temperatures below about 5° C. such as poly(butadiene-styrene) polyols and poly(butadiene) polyols; polyester polyols such as are prepared by polymerizing polyols such as diethylene glycol, trimethylol propane or 1,4-butanediol with polycarboxylic acids such as phthalic, terephthalic, adipic, maleic or succinic acids, in a ratio to provide unreacted hydroxyl groups in the product; glyceride esters of hydroxylated fatty acids such as castor oil, glycerol monoricinoleate, blown linseed oil and blown soya oil; and polyester polyols such as are prepared by the polymerization of a lactone such as epsilon caprolactone.

Polyisocyanates which can be reacted with polyols to form isocyanate-functional prepolymers can be any isocyanate compound having at least two free isocyanate groups, including aliphatic, cycloaliphatic and aromatic compounds. Representative isocyanates include, without limitation, 2,4-toluene diisocyanate, 2,6-toluene diisocyanate, 4,4'-diphenylmethane diisocyanate, m- and p-phenylene diisocyanate, polymethylene poly(phenyl isocyanate), hexamethylene diisocyanate, 4,4'-methylenebis(cyclohexyl isocyanate), isophorone diisocyanate, and other aliphatic, heterocyclic and aromatic polyisocyanates, and including mixtures of such polyisocyanates. Currently, cycloaliphatic and aromatic polyisocyanates are preferred. Hydroxyl-functional monomers that can be reacted with the isocyanate-functional prepolymer to provide unsaturation in the olefinic urethane reaction product include, without limitation, hydroxyethyl acrylate, hydroxyethyl methacrylate, and alkyl alcohol.

Phosphorus-containing compounds that enhance metal adhesion as well as slow cure rate can be any derivative of phosphinic acid, phosphonic acid or phosphoric acid having at least one P—OH group and at least one organic moiety characterized by the presence of an olefinic group, which is preferably terminally located. A listing of such phosphorus compounds is found in U.S. Pat. No. 4,223,115. However, an advantage of the present invention is that a less expensive vinyl aromatic compound can be substituted for a portion or all of the more-expensive phosphorus-containing compound.

If a phosphorus-containing compound is still desirable for enhanced metal adhesion, a preferred phosphorus-containing compound has a structure that may be represented by the formula

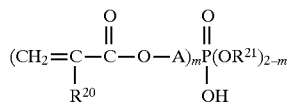

wherein $R^{20}$ is selected from the group consisting of hydrogen, an alkyl group having from one to 8, preferably one to 4, carbon atoms, and $CH^2=CH-$; $R^{21}$ is selected from the group consisting of hydrogen, an alkyl group having from one to 8, preferably one to 4 carbon atoms; A is selected from the group consisting of $—R^{22}O—$ and $(R^{23}O)_n$, wherein $R^{22}$ is an aliphatic or cycloaliphatic alkylene group containing from one to 9, preferably 2 to 6, carbon atoms; $R^{23}$ is an alkylene group having from one to 7, preferably 2 to 4, carbon atoms; n is an integer from 2 to 10, and m is one or 2, preferably one.

Phosphorous-containing compounds having vinyl unsaturation are preferred over such compounds having allylic unsaturation, with monoesters of phosphinic, phosphonic and phosphoric acids having one unit of vinyl or allylic, especially vinyl, unsaturation presently being preferred. Representative phosphorus-containing compounds include, without limitation, 2-hydroxyethyl methacrylate phosphate; bis-(2-methacryloyloxyethyl) phosphate; 2-acryloyloxyethyl phosphate; bis-(2-acryloyloxyethyl) phosphate; methyl-(2-methacryloyloxyethyl) phosphate; ethyl methacryloyloxyethyl phosphate; methyl acryloyloxyethyl phosphate; ethyl acryloyloxyethyl phosphate; compounds of the above formula wherein $R^8$ is hydrogen or methyl and $R^9$ is propyl, isobutyl, ethylhexyl, halopropyl, haloisobutyl or haloethylhexyl; vinyl phosphonic acid; cyclohexene-3-phosphonic acid; alpha-hydroxybutene-2 phosphonic acid; 1-hydroxy-1-phenylmethane-1,1-diphosphonic acid; 1-hydroxy-1-methyl-1-diphosphonic acid: 1-amino-1phenyl-1,1-diphosphonic acid; 3-amino-1-hydroxypropane-1,1-diphosphonic acid; amino-tris (methylenephosphonic acid); gamma-aminopropylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl) phosphinic acid and allyl methacryloyloxyethyl phosphinic acid.

The compositions of the invention can also contain from 0 to about 10 percent by weight based on the total weight of the composition of at least one unsaturated polyester resin. Such resin esters are derived from polycarboxylic acids and polyhydric alcohols, preferably dicarboxylic acids and dihydric alcohols, with at least one of the acid and alcohol components being unsaturated. Preferably, the unsaturated polyester resin component will contain a relatively large number of double bonds and be derived from short chain aliphatic polyhydric polyols, such as ethylene glycol and 1,3-propylene glycol, and short chain unsaturated polybasic acids, such as fumaric acid and maleic acid. Such resins can contain quantities of longer chain polyols such as 1,6-hexanediol, as well as higher polybasic acids, such as adipic acid and phthalic acid.

Still further, the compositions of the invention can optionally contain from 0 to about 50 percent by weight based on the total weight of the composition of at least one polyvinyl alkyl ether. Polyvinyl alkyl ethers are well-known in the art. Such ethers will preferably contain 1–8, more preferably 1–4, carbon atoms in the alkyl moiety of the ether.

The compositions of the invention can also include up to about 60, preferably not more than about 30, percent by weight based on the total weight of the composition of a pre-formed polymeric component (in addition to the polymeric materials listed above) having an intrinsic viscosity of 0.1 to 1.3 that are obtained by the polymerization of at least one (meth)acrylic, styrene, substituted (meth)acrylic and non-acrylic olefinic monomers. Exemplary additional pre-formed polymeric materials include poly(methyl methacrylate/n-butylacrylate/ethyl acrylate) (90/5/5); poly (n-butyl methacrylate/isobutyl methacrylate) (50/50); poly (n-butyl methacrylate) and poly (ethyl methacrylate).

The preferred composition can optionally include 0 to 40, preferably 0 to 20 weight percent, based on the total weight of the composition, of an epoxy component that can be any monomeric or polymeric compound or mixture of compounds having an average of greater than one 1,2-epoxy groups per molecule. The polymeric epoxide materials can have a number-average molecular weight of 300 to 10,000. Useful epoxy compounds are well-known and include the polyglycidyl ethers of polyhydric alcohols such as ethylene glycol, triethylene glycol, 1,2-propylene glycol, 1,5-pentanediol, 1,2,6-hexanetriol, glycerol and 2,2-bis(4-hydroxy-cyclohexyl) propane; the polyglycidyl esters of aliphatic or aromatic polycarboxylic acids such as oxalic acid, succinic acid, glutaric acid, terephthalic acid, 2,6-naphthalene dicarboxylic acid and dimerized linolenic acid; the polyglycidyl ethers of polyphenols such as bisphenol A, 1,1-bis(4-hydroxyphenyl)ethane, 1,1-bis(hydroxyphenyl) isobutane, 2,2-bis(4-hydroxy-t-butylphenyl)propane, 1,5-dihydroxynaphthalene and novolak resins; and cycloaliphatic polyglycidyl compounds.

Another optional component is up to 1 percent by weight of a waxy substance selected from the group consisting of paraffin wax, beeswax, ceresin wax and spermaceti wax.

The environmental resistance of an adhesive system made from the composition of the invention can be improved by the optional addition of 0.005 to 15, preferably 0.1 to 10, percent by weight, based on the total weight of components (a)–(f), of a mixture of a metal molybdate such as zinc molybdate, calcium molybdate, barium molybdate and/or strontium molybdate and an inert filler such as zinc phosphate, calcium phosphate, magnesium phosphate and/or calcium carbonate. Such mixtures are more fully described in U.S. Pat. No. 4,017,315.

The compositions can also optionally include polybasic lead salts of phosphorus acid and saturated and unsaturated organic dicarboxylic acids and acid anhydrides, particularly dibasic lead phthalate, monohydrous tribasic lead maleate, tetrabasic lead fumarate, dibasic lead phosphite and mixtures thereof; and zinc oxide, in an amount of about 0.1 to about 15, preferably about 1 to about 10, percent by weight, based on the total weight of the composition. These compounds can be effective in improving environmental resistance.

The ambient temperature-reactive catalyst systems that may be employed in the preferred systems are well-known redox couple systems and need not be discussed herein in detail. Basically, such systems comprise at least one oxidizing agent and at least one reducing agent which are co-reactive at room temperature to generate free radicals effective to initiate addition polymerization reactions and cure the adhesive. Substantially any of the known oxidizing and reducing agents which are so co-reactive can be employed. Representative oxidizing agents (also known as free radical generators) include, without limitation, organic peroxides, such as benzoyl peroxide, dicumyl peroxide and other diacyl peroxides, hydroperoxides such as cumene hydroperoxide and tertiary butyl hydroperoxide, peresters such as β-butylperoxybenzoate and tertiary butyl peroxide acetate, and ketone hydroperoxides such as methyl ethyl ketone; and compounds containing a labile chlorine such as sulfonyl chloride. Representative reducing agents (also known as initiators or accelerators) include, without limitation, sulfinic acids; alpha-aminosulfones such as bis(tolysulfonmethyl)-benzyl amine; tertiary amines such as diisopropyl-p-toluidine, dimethyl aniline and dimethyl-p-toluidine; and aminealdehyde condensation products, for example, the condensation products of aliphatic aldehydes such as butyraldehyde with primary amines such as aniline or butylamine. The use of known promoters (such as an organic salt of a transition metal, such as cobalt, nickel, manganese or iron naphthenate, copper octoate, copper acetylacetonate, iron hexoate or iron propionate) with the redox couple catalyst systems can be advantageous. Preferably, the amount of reducing agent is in the range from about 0.05 to about 10 preferably about 0.1 to about 6, percent by weight of the part that includes the curable component.

In the two package embodiment of the invention the second package can include a bonding activator that includes the oxidizing agent for the redox catalyst system. The bonding activator can include:

(1) from about 0.5 to about 50 percent by weight, based on total weight of bonding activator, of at least one oxidizing agent which can function as an oxidant of a redox couple catalyst system; and (2) from about 30 to about 99.5 percent by weight, based on total weight of bonding activator, of a carrier vehicle. In addition, the bonding activator also can contain either the epoxy component or the phosphorus-containing compound.

The carrier vehicles which are suitable for use in the bonding activators can be a simple inert solvent or diluent such as methylene chloride, or butyl benzyl phthalate, including mixtures of such solvents or diluents. The carrier vehicle should contain no more than 5% by weight of any moiety which is reactive with the oxidizing agent at room temperature. The carrier vehicle can be a more complex mixture including at least one film-forming binder in addition to inert solvent or diluent. In this case, the film-forming binder is preferably substantially inert with respect to the oxidant which is present in the accelerator composition. A particularly preferred carrier vehicle comprising at least one film-forming binder is an admixture comprising from about 0.05 to about 50 percent by weight of, (1), at least one saturated organic polymeric film-forming binder having a glass transition temperature in the range from about 0° C. to about 150° C. or, (2), at least one polymer-in-monomer syrup as described herein; and from about 40 to about 99 percent by weight of at least one organic solvent capable of maintaining the film-forming binder, phosphorus-containing compound when incorporated into the bonding activator composition, and oxidizing agent as a stable solution or dispersion. Among the polymeric film-forming binder materials that can be employed in the carrier vehicle are, without limitation, polyalkylacrylates and methacrylates and copolymers thereof, polystyrene and copolymers thereof, vinyl polymers and copolymers, polyesters, polyketones, polysulfones, phenolic resins, polyvinyl butyrals and polycarbonates. The carrier vehicle can contain, in addition to solvent or solvent and film-forming binder, additives such as external plasticizers, flexibilizers, suspenders and stabilizers, providing that any such additives do not unacceptably adversely affect the stability of the activator composition.

Another optional component is 0.01 to 10, preferably 0.5 to 5, percent by weight, based on the total weight of components (a)–(f), of tertiary amines represented by the structure

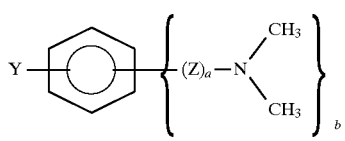

wherein Z is methylene; Y is selected from the group consisting of hydrogen, hydroxy, amino, halogen, alkyl having 1 to 8, preferably 1 to 4, carbon atoms, and alkoxy having 1 to 8, preferably 1 to 4, carbon atoms; a is 0 or 1; and b is 1 or 2.

This tertiary amine is advantageous in accelerating the cure of such compositions containing the unsaturated organophosphorus compounds. Especially preferred tertiary amines are N,N-dimethyl aniline and N,N-dimethylaminomethylphenol.

The components of the composition are mixed together by means well known in the art. The catalyst, of course, is not activated until curing of the composition is desired. A particular advantage of the invention is that the vinyl aromatic compound can be initially mixed with the other components during manufacturing of the composition or the vinyl aromatic compound can be added subsequently as needed to the previously mixed other components. Thus, a standard masterbatch of the other components can be prepared and then the vinyl aromatic compound can be mixed with varying amounts of that masterbatch to create products have specifically tailored cure rates. The addition of such a small amount of vinyl aromatic compound does not adversely effect the properties of the resulting composition regardless of whether it is added during or after the mixing of the other components.

The preferred adhesive systems are provided as multipack adhesive systems where one package contains the polymerizable adhesive composition and the vinyl aromatic compound and a second package contains the bonding activator, with the two packages being mixed at the time of use. It is necessary that the epoxy compound when incorporated into the adhesives of this invention be kept separate from compounds having acidic moieties, such as the phosphorus-containing compound and methacrylic acid to inhibit premature reaction between these components. Thus, in such cases, prior to using the compositions, one package will contain the phosphorus-containing compound and the other package will contain the epoxy component. Preferably, the epoxy component will be incorporated into the bonding activator which contains the oxidizing agent of the redox couple catalyst system, with the phosphorus-containing compound being incorporated into the package containing the polymerizable adhesive composition. While other multipack systems are available, e.g., the bonding activator can contain the reducing agent of the redox couple catalyst system and the epoxy resin with the oxidizing agent and polymerization inhibitors being incorporated into the package containing the polymerizable adhesive mass, they are less preferable with respect to shelf stability. After mixing the individual packages, one or both surfaces to be joined are coated with the mixed adhesive system and the surfaces are placed in contact with each other.

Generally, the composition systems include the first and second packages in conventional amounts, for example, in a volume ratio of about 24:1 to about 1:1, preferably about 10:1 to about 1:1, first package:second package ratio.

The adhesive systems of the invention may be used to bond metal surfaces, such as steel, aluminum and copper, to a variety of substrates, including metal, plastics, and other polymers, reinforced plastics, fibers, glass, ceramics, wood and the like. It is a feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing. They can also be employed on porous substrates, unlike the anaerobic adhesives which require the exclusion of air and thus cannot be used on surfaces containing air in their pores.

Examples are provided below to describe the invention in more detail.

EXAMPLE 1

Control

The following ingredients were mixed together to form a masterbatch:

|  | Weight % |
| --- | --- |
| Methacrylated polybutadiene rubber | 35.5 |
| Wollastonite pigment, 325 mesh | 17.5 |
| Fumed silica, (HS-5 available from Cabot) | 4.6 |
| 2-Hydroxyethyl methacrylate phosphate | 3.0 |
| Methacrylic acid | 2.5 |
| Diisopropanol-p-chloroaniline | 2.5 |
| Methyl methacrylate | 29.2 |
| Synthetic spermaceti wax (available from Witco) | 1.2 |

The methacrylated polybutadiene rubber is described in U.S. Pat. No. 4,769,419, referenced above. The weight percents of the masterbatch only sum to 96 percent because it is based on the total weight of the compositions of Examples 2 and 3 below. This masterbatch was mixed in a 4:1 volume ratio with Accelerator 19, a benzoyl peroxide oxidizing agent commercially available from Lord Corp. resulting in a 20 g mixture. The exotherm behavior of the resulting reaction was measured with a thermocouple (i.e., the highest temperature was recorded). The time to reach peak exotherm is not the same as the actual time required to reach complete cure in a commercially applied adhesive application (the peak exotherm time is usually shorter). However, for a given mass, the exotherm behavior directly correlates and is thus representative of the time required to reach complete cure in a commercially applied adhesive application.

In the case of Example 1, the time from mixing the masterbatch with the oxidizing agent to peak exotherm was 37.8 minutes. Example 1 is the control example since it did not include any vinyl aromatic compound according to the invention.

EXAMPLES 2 AND 3

Two g of a mixture of methyl methacrylate and 4-methylstyrene was added to 48 g of the masterbatch of Example 1 so that the resulting composition contained 1 weight % (Example 2) and 2 weight % (Example 3), respectively, of 4-methylstyrene based on the total weight of the resulting composition (excluding the amount of Accelerator 19). The time to peak exotherm was 53.2 minutes for Example 2 and 64.2 minutes for Example 3. These results clearly show that the addition of the 4-methylstyrene decelerates the cure rate.

EXAMPLE 4

Control

The following ingredients were mixed together to form a masterbatch:

|  | Parts by weight |
|---|---|
| Methyl methacrylate | 82 |
| Polychloroprene (DuPont NPS 9102 neoprene) | 10 |
| N,N-dimethylaniline | 2 |
| 3-(trimethoxysilyl) propyl methacrylate | 1 |
| Methyl ether of hydroquinone | 0.0030 |

This masterbatch was mixed in a 95:5 weight ratio with powdered benzoyl peroxide to form a 20 g mass. The exotherm behavior of the resulting reaction was measured with a recording thermometer. The time to peak exotherm was 12.3 minutes. Example 4 is a control since it did not include any vinyl aromatic compound according to the invention.

EXAMPLES 5–18

One pbw of the following vinyl aromatic compounds was mixed in a composition the same as that of Example 4 except that there was 81 pbw of methyl methacrylate rather than 82 pbw methyl methacrylate. Each masterbatch was mixed in a 95:5 weight ratio with powdered benzoyl peroxide to form a 20 g mass. The exotherm behavior of the resulting reaction was measured with a recording thermometer. The time to peak exotherm for each example is shown below. These results clearly show that the addition of various vinyl aromatic compounds decelerates the cure rate.

| Example | Vinyl aromatic compound | Time(min) |
|---|---|---|
| 5 | α-methylstyrene | 28.4 |
| 6 | 3-methylstyrene | 15.4 |
| 7 | 4-methylstyrene (i.e., vinyl toluene) | 16.3 |
| 8 | 4-tert-butylstyrene | 15.0 |
| 9 | 4-methoxystyrene | 14.6 |
| 10 | 9-vinylanthracene | 18.1 |
| 11 | 2-bromostyrene | 13.6 |
| 12 | 3-bromostyrene | 14.3 |
| 13 | 4-bromostyrene | 14.1 |
| 14 | 4-acetoxystyrene | 13.3 |
| 15 | 4-benzyloxy-3-methoxystyrene | 13.4 |
| 16 | 4-chloromethylstyrene | 14.4 |
| 17 | 4-vinylpyridine | 13.4 |
| 18 | 1,1-diphenylethylene | 25.5 |

EXAMPLE 19

Control

The following ingredients were mixed together to form a masterbatch:

|  | Parts by weight |
|---|---|
| Methyl methacrylate | 52.5 |
| Chlorosulfonated polyethylene (Hypalon 20) | 40 |
| Methacrylic acid | 7.5 |
| Diethylene glycol dimethacrylate | 1.0 |
| Cumene hydroperoxide | 0.5 |

This masterbatch was mixed in a 99:1 weight ratio with the condensation product of butyraldehyde and aniline (commercially available from R.T Vanderbilt Co. under the tradename VANAX 808) to form a 20 g mass. The exotherm behavior of the resulting reaction was measured with a recording thermometer. The time to peak exotherm was 5.7 minutes. Example 19 is a control since it did not include any vinyl aromatic compound according to the invention.

EXAMPLES 20 AND 21

One pbw of the following vinyl aromatic compounds was mixed in a composition the same as that of Example 19 except that there was 51.5 pbw of methyl methacrylate rather than 52.5 pbw methyl methacrylate. Each masterbatch was mixed in a 99:1 weight ratio with Vanax 808 to form a 20 g mass. The exotherm behavior of the resulting reaction was measured with a recording thermometer. The time to peak exotherm for each example is shown below. These results clearly show that the addition of various vinyl aromatic compounds decelerates the cure rate of a composition that is catalyzed by a free radical generator other than benzoyl peroxide.

| Example | Vinyl aromatic compound | Time(min) |
|---|---|---|
| 20 | 4-methylstyrene (i.e., vinyl toluene) | 8.1 |
| 21 | α-methylstyrene | 25.0 |

What is claimed is:

1. A free radical curable composition having a cure rate comprising:
    (a) a free radical curable part comprising at least one free radical curable component; and
    (b) a vinyl aromatic compound that is chemically different than the free radical curable component, wherein the vinyl aromatic compound is selected from α-methylstyrene and 4-methylstyrene and is present in an amount of less than 5 weight percent based on the weight of the free radical curable part, such amount being sufficient to decelerate the cure rate of the free radical composition without adversely effecting completion of cure and the properties of the curable composition after it has cured.

2. A composition according to claim 1 wherein the free radical curable component comprises an ethylenically unsaturated monomer selected from the group consisting of a (meth)acrylic-based monomer, a maleate ester, a fumarate ester, a vinyl ester, a conjugated diene, an itaconic acid or ester and a vinylidene halide.

3. A composition according to claim 2 wherein the free radical curable component comprises a (meth)acrylic-based monomer.

4. A composition according to claim 1 wherein the free radical component is present in an amount of 10 to 90 weight percent based on the total weight of the free radical curable part.

5. The composition according to claim 1 wherein the amount of the vinyl aromatic compound is less than 2 weight percent based on the weight of the free radical curable part.

6. A method for adjusting the cure rate of a free radical curable adhesive composition comprising making a free radical curable part by mixing together at least:
    (a) at least one free radical curable ethylenically unsaturated monomer selected from the group consisting of a (meth)acrylic-based monomer, a maleate ester, a fumarate ester, a vinyl ester, a conjugated diene, an itaconic acid or ester and a vinylidene halide;
    (b) an elastomer;

(c) at least one component of a free radical catalyst system; and (d) a vinyl aromatic compound that is chemically different than the ethylenically unsaturated monomer, wherein the vinyl aromatic compound is added in an amount of less than 5 weight percent based on the weight of the free radical curable part, such amount being sufficient to decelerate the cure rate of the adhesive composition without adversely effecting completion of cure and the properties of the curable composition after it has cured.

7. A method according to claim 6 wherein the vinyl aromatic compound is mixed into the adhesive composition after components (a), (b) and (c) are mixed together.

8. A method according to claim 6 wherein the vinyl aromatic compound has a structure represented by:

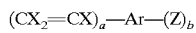

wherein each X is the same or different and is selected from the group consisting of hydrogen, alkyl, aryl and halogen; Ar is at least one aryl ring; and Z is a substituent on any position of the aryl ring and is selected from the group consisting of alkyl, alkoxy, aryl, aryloxy, halogen, haloalkyl, haloaryl, alkylaryl, arylalkyl, alkanoyl, and oxyalkanoyl; a is 1 or 2; and b is 0 to 9.

9. A method according to claim 6 wherein the ethylenically unsaturated monomer is a (meth)acrylic-based monomer and the vinyl aromatic compound is selected from the group consisting of α-methylstyrene and 4-methylstyrene.

10. A method according to claim 6 wherein the amount of the vinyl aromatic compound is less than 2 weight percent based on the weight of the free radical part.

11. A method according to claim 8 wherein b is at least 1.

12. A method according to claim 6 wherein the vinyl aromatic compound is selected from the group consisting of α-methylstyrene, 3-methylstyrene, 4-methylstyrene, 4-tert-butylstyrene, 4-methoxystyrene, 9-vinylanthracene, 2-bromostyrene, 3-bromostyrene, 4-bromostyrene, 4-acetoxystyrene, 4-benzyloxy-3-methoxystyrene, 4-chloromethylstyrene, 4-vinylpyridine, 1,1-diphenylethylene, styrene, α-methyl-p-methyl styrene, 2-vinyl pyridine and divinyl benzene.

13. A method according to claim 6 wherein the adhesive comprises a two package adhesive wherein one package includes the free radical curable part and at least one reducing agent and the second package includes at least one oxidizing agent.

14. A method for adjusting the cure rate of a free radical curable adhesive composition comprising mixing together:

(a) at least one free radical curable ethylenically unsaturated monomer selected from the group consisting of a (meth)acrylic-based monomer, a maleate ester, a fumarate ester, a vinyl ester, a conjugated diene, an itaconic acid or ester and a vinylidene halide;

(b) an elastomer; and (c) at least one component of a free radical catalyst system, to form a masterbatch and then mixing with the masterbatch (d) a vinyl aromatic compound that is chemically different than the ethylenically unsaturated monomer, wherein the vinyl aromatic compound is added in an amount sufficient to decelerate the cure rate of the adhesive composition without adversely effecting completion of cure and the adhesive properties of the curable composition after it has cured.

15. A method according to claim 14 wherein the vinyl aromatic compound has a structure represented by:

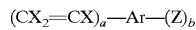

wherein each X is the same or different and is selected from the group consisting of hydrogen, alkyl, aryl and halogen; Ar is at least one aryl ring; and each Z is the same or different, is a substituent on any position of the aryl ring and is selected from the group consisting of alkyl, alkoxy, aryl, aryloxy, halogen, haloalkyl, haloaryl, alkylaryl, arylalkyl, alkanoyl, and oxyalkanoyl; a is 1 or 2; and b is 0 to 9.

16. The method according to claim 14 wherein the vinyl aromatic compound is present in an amount sufficient to decelerate the cure rate at room temperature by at least 2 minutes.

17. A free radical curable adhesive composition having a cure rate comprising:

(a) a free radical curable part including at least one free radical curable component comprising an ethylenically unsaturated monomer selected from the group consisting of a (meth)acrylic-based monomer, a maleate ester, a fumarate ester, a vinyl ester, a conjugated diene, an itaconic acid or ester and a vinylidene halide;

(b) a vinyl aromatic compound that is chemically different than the free radical curable component, wherein the vinyl aromatic compound is present in an amount of less than 5 weight percent based on the weight of the free radical curable part, such amount being sufficient to decelerate the cure rate of the free radical composition without adversely effecting completion of cure and the properties of the curable composition after it has cured; and (c) a free radical catalyst system for curing the adhesive.

18. A composition according to claim 17 wherein the amount of the vinyl aromatic compound is less than 2 weight percent based on the weight of the free radical curable part.

19. A composition according to claim 17 wherein the vinyl aromatic compound has a structure represented by:

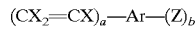

wherein each X is the same or different and is selected from the group consisting of hydrogen, alkyl, aryl and halogen; Ar is at least one aryl ring; and Z is a substituent on any position of the aryl ring and is selected from the group consisting of alkyl, alkoxy, aryl, aryloxy, halogen, haloalkyl, haloaryl, alkylaryl, arylalkyl, alkanoyl, and oxyalkanoyl; a is 1 or 2; and b is 0 to 9.

20. A composition according to claim 19 wherein the vinyl aromatic compound is selected from the group consisting of α-methylstyrene, 3-methylstyrene, 4-methylstyrene, 4-tert-butylstyrene, 4-methoxystyrene, 9-vinylanthracene, 2-bromostyrene, 3-bromostyrene, 4-bromostyrene, 4-acetoxystyrene, 4-benzyloxy-3-methoxystyrene, 4-chloromethylstyrene, 4-vinylpyridine, 1,1-diphenylethylene, styrene, α-methyl-p-methyl styrene, 2-vinyl pyridine and divinyl benzene.

21. A composition according to claim 20 wherein the vinyl aromatic compound is selected from the group consisting of α-methylstyrene and 4-methylstyrene.

22. A composition according to claim 19 wherein the ethylenically unsaturated monomer is a (meth)acrylic-based monomer.

23. A composition according to claim 21 wherein the ethylenically unsaturated monomer is a (meth)acrylic-based monomer.

24. A composition according to claim 17 further comprising:

(c) 10–80 weight percent of an elastomer;
(d) 0–40 weight percent of an olefinic urethane reaction product of an isocyanate-functional prepolymer and a hydroxy-functional monomer having at least one unit of polymerizable unsaturation, the reaction product being characterized by the presence of at least two units of unsaturation and the substantial absence of free isocyanate products; and
(e) 0–20 weight percent of a phosphorus-containing compound having one or more olefinic groups and no less than one P—OH group, wherein the weight percents are based on the total weight of components (a)–(e).

25. A composition according to claim 24 wherein the ethylenically unsaturated monomer is a (meth)acrylic-based monomer and the vinyl aromatic compound has a structure represented by:

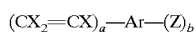

wherein each X is the same or different and is selected from the group consisting of hydrogen, alkyl, aryl and halogen; Ar is at least one aryl ring; and Z is a substituent on any position of the aryl ring and is selected from the group consisting of alkyl, alkoxy, aryl, aryloxy, halogen, haloalkyl, haloaryl, alkylaryl, arylalkyl, alkanoyl, and oxyalkanoyl; a is 1 or 2; and b is 0 to 9.

26. A composition according to claim 24 wherein the amount of the vinyl aromatic compound is less than 2 weight percent based on the weight of the free radical curable part.

27. A composition according to claim 9 wherein b is at least 1.

28. A composition according to claim 9 wherein the adhesive comprises a two package adhesive wherein one package includes the free radical curable part and at least one reducing agent and the second package includes at least one oxidizing agent.

* * * * *